United States Patent [19]

Straub

[11] 3,927,209
[45] Dec. 16, 1975

[54] PARA-INFLUENZA-3-VIRUS

[75] Inventor: Otto Christian Straub, Teubingen, Germany

[73] Assignee: Bayer Aktiengesellschaft, Germany

[22] Filed: May 6, 1974

[21] Appl. No.: 467,479

[30] Foreign Application Priority Data
May 11, 1973 Germany............................ 2323847

[52] U.S. Cl. ................................................. 424/89
[51] Int. Cl.² .................. A61K 39/12; A61K 39/34
[58] Field of Search ....................................... 424/89

[56] References Cited
UNITED STATES PATENTS
3,501,770   3/1970   Gale et al. ............................ 424/89

OTHER PUBLICATIONS
Andrewes et al., Viruses of Vertebrates, 2nd ed., published by Bailliere et al., London, 1967, pages 186–188.

*Primary Examiner*—Shep K. Rose

[57] ABSTRACT

PI-3 virus strain ATCC VR-739 is useful for treating para-influenza-3-virus infection in humans and animals, especially cattle.

7 Claims, No Drawings

PARA-INFLUENZA-3-VIRUS

The present invention is concerned with a live vaccine useful for the immunization of humans and animals against para-influenza-3-virus (PI-3 virus) infection, to a process for the production of said vaccine and to the use of the PI-3 virus strain ATCC VR-739 as a diagnostic agent for the identification of PI-3 virus infections in humans and animals.

The para-influenza-3 virus is widespread in many countries and attacks in particular calves and young cattle. Because of the prevalence and the high contagiousness of this viral infection, it is difficult to keep PI-3 virus away from cattle populations.

In recent years it has been found that when cattle who have PI-3 virus infection are at the same time or later also infected with Chlamydia or Mycoplasma a very serious illness results, particularly in young cattle. When such cattle are infected only with Chlamydia and/or Mycoplasma, the infection is relatively mild. The combination of either or both with PI-3 virus infection, however, results in a very severe infection which is very difficult to treat.

PI-3 infection in humans and animals can, in addition to virus isolation, be diagnosed by the detection of specific antibodies by the known hemagglutination inhibition test (HAI). The diagnosis is dependent on titre level and titre course and therefore requires repeated investigations with, in certain circumstances, a long dilution series of serum obtained at various times. As an antigen for the HAI test, PI-3 virus is used.

When cattle are infected not only with the PI-3 virus but with secondary bacterial infections such as Chlamydia, Mycoplasma or other bacteria, bacterial agents may be used to treat these secondary infections. The main viral infection, i.e., the PI-3 virus infection, however, cannot be so treated. For this reason and also because of the increasing use of animal husbandry and special cattle breeding techniques, a specific immunoprophylactic against PI-3 virus infection is of very important and significant value.

Known vaccines are of two types, either killed or live. With killed vaccines the effect in the case of young calves is questionable. Moreover, the protection does not last very long and the local immunity of the mucous membranes of the respiratory tract is relatively low. A longer-lasting virus excretion in the case of reinfections is not prevented and, thus, a higher danger from the use of such vaccines results to the animal and to the breeder.

In the case of live vaccines, on the other hand, these produce a good and much longer lasting protection, even in young calves. Besides the humoral immunity, there is also produced in the respiratory tract an immunity of the mucosa, which immunity is particularly important because of the pathogenesis of the PI-3 infection.

Live vaccines which are presently on the market, however, are without exception so-called attenuated vaccines, that is, pathogenic PI-3 viral strains passed in suitable tissue cultures until they have lost their original (pathogenic to the natural host) properties. Moreover, serial passages of the order of magnitude of about 100 are necessary to produce these PI-3 attenuated virus vaccines. In the case of such live vaccines produced as attenuated virus vaccines, the possibility of virulence increases through rapid repeated animal passages, particularly under mass inoculation conditions. A further disadvantage of the attenuated virus strain is that the process of continuous attenuation not only changes the pathogenicity but also the antigen specificity. This may have the resulting consequence that the immunity protection against pathogenic viruses which is induced by viruses changed in this manner is no longer wholly or even incompletely formed.

Surprisingly, it has now been found that the PI-3 virus strain isolated from the respiratory tract of a bovine, and which was deposited with American Type Culture Collection under VR-739, was apathogenic per se and thus complete immunity protection was produced without the necessity of attenuation, thereby avoiding the disadvantages of attenuated PI virus strains disclosed above.

The PI-3 virus strain ATCC VR-739, according to the present invention, was isolated in the following manner:

1. Isolation of the PI-3 virus strain ATCC VR-739

Para-influenza-3 virus strain ATCC VR-739 was isolated from the respiratory tract of a bovine using the tissue culture technique utilizing embryonic secondary calves' kidney cells in Earle's medium with the addition of 0.5% lactalbumin hydrolysate and 3% antibody-free, inactivated calf serum.

2. Culturing of PI-3 virus strain ATCC VR-739

PI-3 virus strain ATCC VR-739 is cultured according to the techniques which are per se known using primary cell cultures such as epithelial cells of calves' kidneys, embryonic tracheal cells or permanent cell cultures such as calves' testicular cells. The virus-containing medium of the passages 1–20 is harvested after 2 to 3 days' incubation.

3. Production of PI-3 vaccine

The cultured PI-3 virus strain ATCC VR-739 may be used either directly as a liquid vaccine or, after the addition of suitable stabilizers, in a form of a freeze-dried vaccine according to techniques per se known. If desired, suitable adjuvants may also be admixed therewith. The vaccine may also be combined with other vaccines such as IBR/IPV[1].

[1]IBR = infectious bovine rhinotracheitis IPV = infectious pustular vulvovaginitis The virus solutions obtained as above described according to techniques which are themselves per se known may be formulated according to methods which are well known in the vaccine art. The vaccine may be administered as a solution, syryp, emulsion, suspension, spray, ointment, paste, cream, lotion, aerosol or tablet. Preferably, the vaccine is produced as an intranasal spray by formulations which are per se known in the art or as an intramuscularly administrable vaccine also according to techniques which are per se known.

When the PI-3 virus strain is diluted, suitable solvents and excipients, which are customarily used in the art, may be used with or without the use of emulsifying and/or dispersing agents, spraying agents, propellants and stabilizers, all of which are per se known in the vaccine art. As solvents, excipients, emulsifiers and dispersing agents, those which are particularly useful include water, nontoxic organic solvents or diluents such as paraffins, i.e., mineral oil fractions, vegetable oils, i.e., arachis/sesame oil, alcohols, i.e., ethyl alcohol and glycerol, glycols, i.e., propylene glycol and polyethylene glycol, and water. Solid excipients include natural mineral powders such as highly dispersed silicic acid and silicates, sugars such as sucrose, lactose and glucose.

Emulsifying agents include nonionic and anionic emulsifiers such as polyoxyethylene-fatty acid acid esters, polyoxyethylene-fatty alcohol ethers, alkylsulfonates and arylsulfonates. Dispersing agents include lignin, sulfite waste liquors, methyl cellulose, starch and polyvinyl pyrrolidone and glidants such as magnesium stearate, talc, stearic acid and sodium lauryl sulfate.

Stabilizers include amino acids, sugars, proteins, polysaccharides, polyalkylene glycols and the like. These stabilizers may be added both in aqueous solution and in the lyophilized state.

4. Toxicity

Toxicity was tested according to the following procedure:

In each case 5 ml of a culture virus with a content of $10^{6.5}$ $CID_{50}{}^2$/ml were administered intramuscularly and intranasally. Four groups were used for the tests and in each case four specifically antibody-free calves comprised each group. Two groups were kept under normal maintenance and feeding conditions, while the other two groups were kept overnight at 4° C and in the daytime from 25° C to 35° C for 5 days. The animals in all four groups showed no clinical symptoms although the PI-3 virus was able to be detected up to the 7th day in the nasal secretion of the intranasally inoculated animals. From nasal swabs of the intramuscularly inoculated animals no PI-3 virus was able to be isolated. No toxic side effects were noted.

$^2CID_{50}$ = culture infectious doses

5. Effectiveness

The effectiveness of the PI-3 virus vaccine was tested in a manner analogous to the toxicity tests above described with in each case 3 groups instead of 4 groups of four animals each. The animals on the 28th day after vaccination were each given 5 ml of a suspension of a pathogenic PI-3 virus strain with $10^{7.0}$ $CID_{50}$/ml.

None of the animals of the two vaccinated groups showed any clinical symptoms whatsoever, whereas as all 4 animals of the uninoculated third group showed a rise in temperature and an increased excretion of nasal secretion 2 days after infection. After the interruption of the virus excretion, an antibody titre of 1 to 64 to 1 to 512 was detected in the animals of both the vaccinated groups.

It was further possible to observe that after inoculation, in the case of young calves, a virus increase on the nasal mucosa resulted despite the antibodies transferred by colostrum. Thus, in young calves, a synergistic effect is obtained.

6. Preparation of a live PI-3 virus vaccine

Permanent calves' testicular cell cultures in a serum-free maintenance medium are inoculated in a suitable glass vessel with para-influenza-3 virus strain ATCC VR-739. After 2 to 3 days' incubation, the virus increase is investigated and the virus-containing medium is harvested. After centrifuging for removal of the cell detritus, the virus suspension is deep frozen at −60° C. After testing for sterility, virus titre and freedom for foreign viruses, the vaccine is filled into ampoules or bottles and supplied in either liquid form or in lyophilized form.

The virus culture which is described above may also be used as an antigen for the detection of PI-3 infection in the HAI test.

As to the diagnosis of PI-3 infection by using PI-3 antigen it is referred to an article of K. Bogel and G. Wachendorfer in Deutsche Tierarztliche Wochenschrift 76, No. 7, 171–174 (1969). The test procedure mentioned therein may be divided into three different steps:

1. The determination of the antigen titer
2. The adsorption of unspecific agglutinines of the inactivated sera and
3. the proper HAI test for the determination of the serum titer.

What is claimed is:

1. A vaccine which comprises an amount of para-influenza-3-virus strain ATCC VR-739 sufficient to be effective against para-influenza-3-virus in combination with a diluent or carrier suitable for vaccination of bovines.

2. A vaccine according to claim 1 in nasal inhalation form.

3. A vaccine according to claim 1 in intramuscular injection form.

4. A vaccine according to claim 1 which further comprises an amount of infectious bovine rhinotracheitis and of infectious pustular vulvovaginitis vaccine sufficient to be effective against rhinotracheitis and vulvovaginitis in combination therewith.

5. A method of vaccinating bovines against para-influenza-3-virus infection, which comprises vaccinating said bovines with an amount of a vaccine according to claim 1 sufficient to be effective against para-influenza-3-virus.

6. A method according to claim 5 wherein the vaccination is by nasal inhalation.

7. A method according to claim 5 wherein the vaccination is by intramuscular injection.

* * * * *